United States Patent [19]
Moskowitz et al.

[11] Patent Number: 5,309,447
[45] Date of Patent: May 3, 1994

[54] SPACE COMPRESSION TECHNIQUE FOR PSEUDO-EXHAUSTIVE SELF-TESTING OF DIGITAL ELECTRONIC CIRCUITS

[75] Inventors: Marsha R. Moskowitz, Highland Park; Eleanor Wu, Princeton, both of N.J.

[73] Assignee: AT&T Bell Laboratories, Murray Hill, N.J.

[21] Appl. No.: 709,740

[22] Filed: Jun. 3, 1991

[51] Int. Cl.$^5$ .......................................... H04B 17/00
[52] U.S. Cl. .................................. 371/22.4; 371/22.1
[58] Field of Search ................... 371/22.1, 22.4, 22.5, 371/22.6, 27

[56] References Cited

U.S. PATENT DOCUMENTS

| | | | |
|---|---|---|---|
| 4,513,418 | 4/1985 | Bardell, Jr. et al. | 371/22.4 X |
| 4,811,344 | 3/1989 | Chauvel et al. | 371/22.1 |
| 4,817,093 | 3/1989 | Jacobs et al. | 371/22.3 |
| 4,864,570 | 9/1989 | Savaglio et al. | 371/22.4 |
| 4,945,536 | 7/1990 | Hancu | 371/22.1 X |
| 4,996,689 | 2/1991 | Samad | 371/22.1 X |
| 5,038,349 | 8/1991 | Lipp | 371/22.1 |
| 5,184,067 | 2/1993 | Nozuyama | 371/22.4 X |
| 5,187,712 | 2/1993 | Malleo-Roach et al. | 371/22.1 |
| 5,189,675 | 2/1993 | Nozuyama et al. | 371/22.1 X |
| 5,230,000 | 7/1993 | Mozingo et al. | 371/22.4 |

OTHER PUBLICATIONS

E. J. McCluskey and S. Bozorgui-Nesbat, "Design for Autonomous Test," IEEE Transactions on Computers, vol. C-30, No. 11, Nov. 1981, pp. 866-867.

S. B. Akers, "On the Use of Linear Sums in Exhaustive Testing," Proceedings, Fault Tolerant Computing Conference, pp. 148-153 (IEEE).

E. Wu, "Towards an Optimal Pseudo-Exhaustive Test Generation Algorithm," Conference Proceedings, Built-In Self-Test Workshop, IEEE Test Technology Committee, Mar. 23-25, 1988.

Primary Examiner—Kevin J. Teska
Attorney, Agent, or Firm—Robert B. Levy

[57] ABSTRACT

Compaction of the response signals produced by separate sets of sub-circuits ($12_i$) within a digital circuit (10) under test is accomplished by first analyzing each response signal produced by a corresponding set of sub-circuits (by way of a logic analyzer (16,18)) to determine if the response signal has a particular pattern. A pattern bit is then set in accordance with the response signal which has the particular pattern. The pattern bits are then compacted by a set of daisy-chained time compactors (20), each compactor serving to exclusively OR the pattern bit from a corresponding logic analyzer (16,18) with a compacted bit generated previously by an upstream compactor.

5 Claims, 1 Drawing Sheet

SPACE COMPRESSION TECHNIQUE FOR PSEUDO-EXHAUSTIVE SELF-TESTING OF DIGITAL ELECTRONIC CIRCUITS

TECHNICAL FIELD

This invention relates to a method and apparatus for compacting (compressing) response signals produced by a digital electronic circuit under test.

BACKGROUND OF THE INVENTION

There is currently much interest in providing digital electronic circuits with an internal capability of testing themselves (built-in self-test). One built-in self-test technique which has shown much promise for digital electronic circuits is that of pseudo-exhaustive self-testing, which is described and claimed in co-pending U.S. patent application Ser. No. 484,336, filed on Feb. 26, 1990, in the names of J. A. Malleo-Roach et al. and assigned to AT&T Bell Laboratories (herein incorporated by reference). As described in the Malleo-Roach application, pseudo-exhaustive testing of an electronic circuit is carried out by first partitioning the circuit into individual sub-circuits, hereinafter referred to as "cones," each having only one output and no more than a predetermined number of inputs.

In addition to partitioning the circuit, a test generator is added to the circuit under test for generating a set of vertical canonical vectors at its output. A separate subset of the canonical vectors is then assigned to the inputs of each cone such that the vectors in each subset are independent of each other to assure exhaustive testing of the cone.

Upon receipt of a test vector at its inputs, each cone generates a response signal bit. The response signal bits from the cones are compacted (compressed) to yield a reduced length stream of bits indicative of the response of the cones, which is determinative of whether the circuit contains any faults. For a further description of the above-described pseudo-exhaustive self-testing technique, reference should be had to the Malleo-Roach et al. application, Ser. No. 484,336.

Compaction of the response data has traditionally been accomplished by exclusively OR'ing the response bit produced at each observation point (the output of a cone) with the response bit produced by an upstream cone at an earlier interval. To carry out compaction of the response signals in this manner, Multiple Input Shift Registers (MISRs) have been employed. A typical MISR comprises a plurality of MISR cells daisy-chained together to form a circle, with each cell containing an exclusive OR (XOR) gate having a first input supplied with the response bit from an observation point, such as the output of a cone, and a second input supplied with the output of an upstream MISR cell. Each MISR cell also comprises a flip-flop whose input is supplied with the output of the XOR gate of the cell and whose output is supplied to an input of the XOR gate of a downstream MISR cell. At the completion of testing, the pattern of bits (referred to as a "signature") stored by the MISR will be indicative of the operation of the circuit. By comparing the MISR signature to that obtained when the circuit is fault-free, a determination can be made as to whether the circuit under test has any defects (faults).

The disadvantage associated with the use of MISRs for compacting response signals from a circuit under test is that such devices are not "cost-effective" from the standpoint that each MISR cell generally requires a large number of grids (gates) for its implementation. In the case of a large circuit comprised of many cones, the number of MISR cells will correspondingly be high, imposing a large, undesirable overhead penalty.

Thus, there is a need for a technique for compacting response data which is efficient in terms of the number of elements required for the task.

SUMMARY OF THE INVENTION

Briefly, compaction of multiple streams of response signals, each stream generated by a separate set of sub-circuits within an electronic digital circuit under test, is accomplished by first recognizing whether each corresponding set of sub-circuits produces a response signal having a particular pattern associated therewith. For each set of sub-circuits, a pattern bit is generated indicative of whether the response signal has the particular pattern. By producing a pattern bit indicative of whether the response signal of the corresponding set of sub-circuits has a particular pattern, the bits in such response signal are effectively "space-compressed" into a single bit.

Each pattern bit associated with a corresponding set of sub-circuits is then time-compacted by a separate one of a set of time-compaction cells, each having its output linked to the input of another in daisy-chain fashion. Each time-compaction cell serves to exclusively OR the pattern bit with a compacted bit output by an upstream time-compaction cell. The resultant bit produced following the exclusive OR operation is then stored, typically in a flip-flop in the cell, for subsequent input to a downstream time-compaction cell for exclusive OR'ing with the pattern bit input thereto. The bits stored by the time-compaction cells represent a history of the patterns of the response signals during testing, which greatly aids in fault detection.

DETAILED DESCRIPTION

Figure 1:
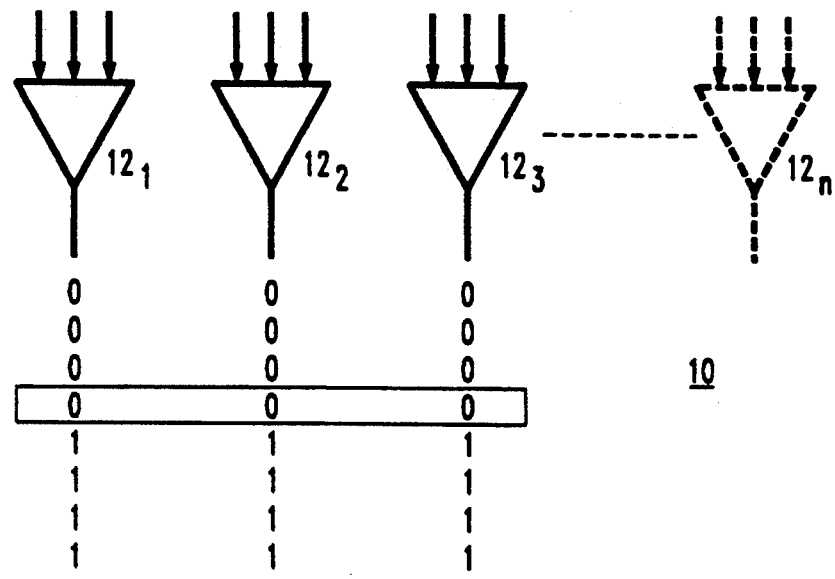
FIG. 1 is a model of a conventional electronic circuit under test.

FIG. 1 is a model of a conventional electronic circuit 10 typically comprised of AND, OR, NOR, NAND and NOT gates (not shown). To test the circuit 10 by the technique described in the aforementioned U.S. patent application Ser. No. 484,336 in the names of J. A. Malleo-Roach et al. (incorporated by reference herein), the circuit is partitioned into sub-circuits or cones $12_1$, $12_2 \ldots 12_n$, only four of which are shown in the illustrated embodiment. Each cone $12_i$ (where $i=1,2 \ldots n$) has only one output and no more than a predetermined number of inputs w where $w=5$ in the illustrated embodiment. As described in the Malleo-Roach et al. application Ser. No. 484,336, the purpose in subdividing the circuit 10 into the cones $12_1$, $12_2 \ldots 12_n$ is to facilitate exhaustive testing thereof by applying a set of canonical test vectors, which are independent of each other, to each cone. By monitoring the sequence of bits generated by the cones $12_1$, $12_2 \ldots 12_n$ following receipt of the test vectors, a determination can be made as to whether the circuit is operating properly.

As the size of the circuit 10 increases, so too will the number of cones $12_1$, $12_2 \ldots 12_n$. To effectively test the circuit 10, the output of each cone $12_i$ must be observed. Thus, as the number of cones $12_i$ increases, the number of signals that must be processed to determine the proper operation of the circuit 10 increases. In accordance with the invention, the testing of a large circuit 10 (having many cones $12_i$) is facilitated by analyzing whether the stream of response signals associated with each of a set of cones $12_i$ has a particular bit pattern and then generating a pattern bit indicative of whether the pattern is present. By compacting the pattern bits over time, the occurrence or sequence of the particular pattern can be determined, which provides a good indication of whether the circuit is operating properly.

For the set of three cones $12_1$, $12_2$ and $12_3$ illustrated in FIG. 1, there will be three bits in the response signal stream produced by the cones. Since each bit in the response signal stream can only be at one of two states (a "0" or a "1"), then only $2^3$ or eight patterns of the response signals are possible as shown in FIG. 1. The exact sequence of the possible response signal stream patterns is dependent on both the pattern of canonical vectors applied to inputs of the cones $12_1$, $12_2$, $12_3$ and the faults (defects), if any, therein. When the circuit 10 is fault-free, a particular one of the eight separate patterns, for example, the pattern [0 1 1], will appear only at certain times when a given set of canonical test vectors is applied to the inputs of the cones $12_1$, $12_2$ and $12_3$. By applying a known set of canonical test vectors to the circuit 10 and detecting when the pattern of [0 1 1] appears in the stream of response signals, a determination can be made as to whether the circuit 10 is operating properly.

Figure 2:
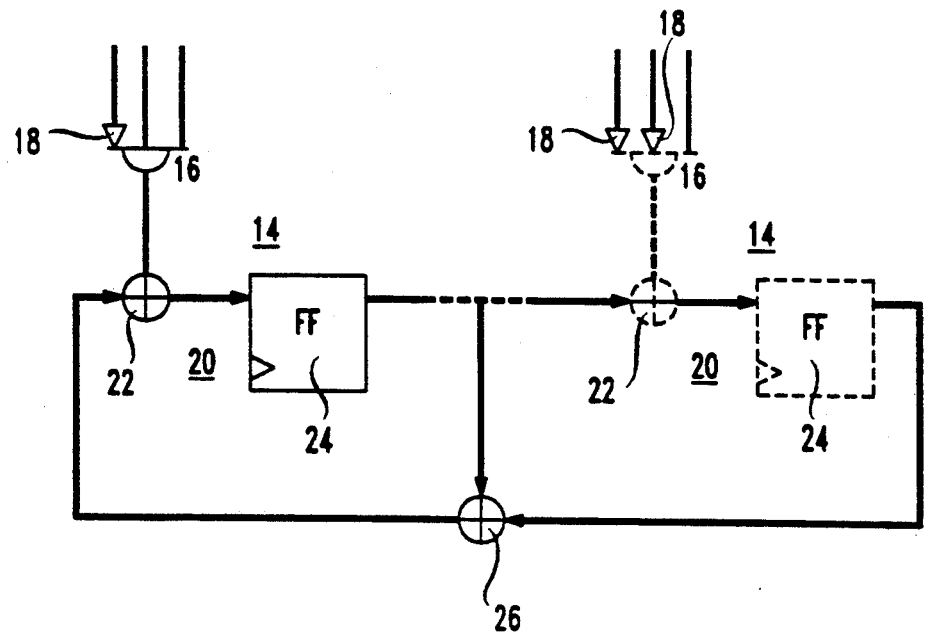
FIG. 2 is a schematic view of a preferred embodiment of a space compressor in accordance with the present invention.

FIG. 2 shows a combination of pattern recognition and compaction units 14, in accordance with the invention, each recognizing the pattern of the response signal for each set of cones $12_i$, for generating a pattern bit indicative of the presence of such a pattern, and for compacting the pattern bit with other such pattern bits over time so that the units collectively yield a compacted bit stream indicative of the sequence of patterns in the response signal streams. Actual recognition of a particular pattern of bits in the response signal produced by a group of cones, such as the cones $12_1$, $12_2$, $12_3$ of FIG. 1 by each unit 14, is accomplished by a logic gate 16, typically and AND or NAND gate having as many inputs as bits in the response signal stream. The inputs to the logic gate 16 are selectively inverted, by way of one or more inverters 18, so that the logic gate only "recognizes" a particular pattern. In other words, the gate 16 will output a bit at a logic "1" level only when a particular pattern of bits is present at its inputs.

In order for the gate 16 to recognize the pattern [0 1 1], the first input of the gate is inverted by the inverter 18, as seen in FIG. 2, the remaining inputs not being inverted. Other patterns of interest would require others of the inputs to the gate 16 to be inverted accordingly. Note that if the particular pattern of interest is [1 1 1], no inversion of the inputs of the gate 16 is required for the gate to recognize the pattern.

The output bit of the logic gate 16, hereinafter referred to as the pattern bit, is input to a Multiple Input Shift Register (MISR) cell 20 associated with the logic gate for compacting the pattern bit produced thereby with another compacted bit produced by another MISR cell. As will be discussed, each MISR cell 20 associated with a group of cones $12_i$ is daisy chained with each of the other MISR cells in a loop. Each MISR cell 20 comprises an exclusive OR (XOR) gate 22 having a first input, supplied with the pattern bit output by its associated gate 16, and a second input supplied with a compacted bit from an upstream MISR cell associated with another set of cones $12_i$. The XOR gate 22 has its output input to a flip-flop 24 whose output forms the output of the cell 20 which is input to a downstream MISR cell 20.

When the circuit 10 is large and is partitioned, the circuit will be divided into many cones $12_i$. Associated with each group of cones $12_i$ is a separate pattern recognition and compaction unit 14, as indicated by the presence in FIG. 2 of two such units, the second shown by dashed lines. Under this condition, the second input to the XOR gate of each MISR cell 20 of each pattern recognition and compaction apparatus 14 is supplied with the output of the MISR cell associated with an upstream recognition and compaction apparatus. By the same token, the output of the flip-flop 24, which forms the output of the MISR cell 20, is input to the second input of the XOR gate 22 of a downstream cell. The output of the last MISR cell 20 in the chain is typically exclusively OR'd with the output of another cell in the chain via an XOR gate 26 before being fed back to the first cell.

In operation, when an initial set of test vectors is applied to the inputs of each set of sub-cones $12_i$, each corresponding cone set will produce a response signal input to the corresponding gate 16 of its corresponding pattern recognition and compaction unit 14. The gate 16 will output a pattern bit whose state is indicative of whether the response signal has the particular pattern, for input to the XOR gate 22 of the associated MISR cell 20. At the outset of operation, the bit (i.e., the "compacted" bit) stored by the flip-flop 24 of the upstream MISR cell 20 will typically be a "0" so that the bit produced by the gate 16 will be passed directly to the flip-flop 24 of the MISR cell associated with that gate.

For each test vector applied subsequently to a set of cones $12_i$, the process is repeated, except that the bit stored by each flip-flop 24 of each MISR cell 20 is now determined by both the state of the compacted bit stored by the upstream MISR cell as well as the state of the current pattern bit. In this way, the bits stored by the MISR cells 20 in the chain (referred to as the "signature") reflect the history of the patterns of the signals generated by the sets of cones $12_i$.

The pattern recognition and compaction unit 14 of the present invention affords a distinct advantage over other compaction schemes. For example, as compared to a conventional MISR (not shown) which is comprised of a plurality of cells, each identical to the MISR cell 20, the pattern recognition and compaction unit 14 imposes a smaller circuit overhead. With a conventional MISR, a separate cell (identical to each MISR cell 20) is required for each observation point (i.e., for each cone $12_i$). Since each cell of a conventional MISR requires at least 20 grids (gates) for implementation, at least 60 grids would be required for a group of three cells. On the other hand, the logic gate 16 of the pattern recognition and compaction unit 14 of the invention can generally be implemented with four grids. With the addition of the inverter 18 (two grids) as well as the MISR cell 20 (twenty grids), a total of twenty-six grids are consumed, a significant savings as compared to a conventional MISR.

Moreover, the pattern recognition and compaction apparatus 14 also facilitates very high fault coverage, that is, very high detection of faults in the circuit 10 of FIG. 1. As discussed earlier, when the cones $12_1$, $12_2$ and $12_3$ are supplied with a set of canonical test vectors, only eight separate response signal patterns are possible. By knowing the sequence of response signal patterns for a fault-free condition, and by monitoring the actual patterns of response signals during testing, a determination can be made whether the circuit has any faults. Depending on the response signal stream pattern being monitored, fault coverage of between 98.5% and 99.5% has been found achievable using the pattern recognition and compaction units 14 of the invention.

The foregoing describes an apparatus 14 which advantageously serves both to recognize the presence of a particular response signal stream pattern produced by a circuit 10 under test and to compact information related to the sequence of the occurrence of such a pattern.

It is to be understood that the above-described embodiments are merely illustrative of the principles of the invention. Various modifications and changes may be made thereto by those skilled in the art which will embody the principles of the invention and fall within the spirit and scope thereof.

We claim:

1. A method for compacting a plurality of response signals, each generated by a separate set of sub-circuits within an electronic digital circuit under test, comprising the steps of:

logically analyzing each response signal generated by each set of sub-circuits and generating a pattern bit indicative of whether that response signal has a particular pattern;

time compacting each pattern bit of each set of sub-circuits by exclusively OR'ing it with a compacted bit generated previously by the same subset of circuits to yield a current compacted bit for subsequent exclusive OR'ing with a subsequently generated pattern bit associated with a different set of sub-circuits; and repeating the steps of logically analyzing each response signal and time-compacting each pattern bit for a predetermined number of times.

2. The method according to claim 1 wherein the step of logically analyzing the stream of response signals generated by each separate group of sub-circuits comprises the steps of:

inverting selected bits in the stream of response signals; and applying each of the bits in the response signal, as selectively inverted, to a separate one of the inputs of a logic gate, which in response generates a pattern bit in accordance with the state of the bits in the response signal, as selectively inverted.

3. Apparatus for compacting a plurality of streams of response signals, each response signal produced by a separate set of sub-circuits within an electronic digital circuit under test, comprising:

a plurality of logic-analyzing means, each serving to analyze the response signal generated by a separate set of sub-circuits and producing a response bit indicative of whether the response signal produced by the corresponding sub-circuit has a particular pattern; and a plurality of time-compaction means, each associated with each logic-analyzing means and connected in a daisy-chain fashion in a loop for producing a time-compacted bit in accordance with both the pattern bit from the corresponding logic-analyzing means connected thereto and with a time-compacted bit produced previously by a time-compaction means associated with another logic analyzer means.

4. The apparatus according to claim 3 wherein each said logic-analyzing means comprises:

means for selectively inverting selected bits of the response signal input to the logic-analyzing means; and a logic gate having a plurality of inputs, each input supplied with a corresponding one of the bits of the response signal, as selectively inverted by said inverting means.

5. The apparatus according to claim 3 wherein each said time-compaction means comprises:

an exclusive OR gate having a first input supplied with the output of the logic-analyzing means associated with said time-compaction means, a second input supplied with the output of a first other time-compaction means and an output; and a flip-flop coupled to the output of said exclusive OR gate for storing the signal produced thereby and for supplying said signal at subsequent intervals to a second other time-compaction means.

* * * * *